United States Patent [19]
Schmitt

[11] 3,788,601
[45] Jan. 29, 1974

[54] NON-RISE VALVE FOR FAUCETS OR THE LIKE

[75] Inventor: William C. Schmitt, Brown Deer, Wis.

[73] Assignee: Milwaukee Faucets, Inc., Milwaukee, Wis.

[22] Filed: June 21, 1972

[21] Appl. No.: 264,779

[52] U.S. Cl............ 251/304, 137/454.6, 137/636.3, 251/288
[51] Int. Cl............................................. F16k 11/06
[58] Field of Search ........... 251/172, 304, 284, 288; 137/625.17, 625.4, 625.41, 636.3, 454.6

[56] References Cited
UNITED STATES PATENTS

| | | | |
|---|---|---|---|
| 3,192,943 | 7/1965 | Moen.............................. | 251/288 X |
| 3,223,111 | 12/1965 | Anderson........................ | 251/288 X |
| 2,106,942 | 2/1938 | Beehler et al.................. | 251/284 X |
| 3,674,048 | 7/1972 | Manoogian................ | 137/625.41 X |
| 3,704,728 | 12/1972 | Huneke.................... | 137/625.4 X |
| 3,698,418 | 10/1972 | Schmitt...................... | 137/636.3 X |
| 3,556,151 | 1/1971 | Masuda........................... | 251/172 X |
| 3,543,799 | 12/1970 | Hayman.................... | 137/625.17 X |

Primary Examiner—Samuel Scott
Assistant Examiner—Ira S. Lazarus
Attorney, Agent, or Firm—James E. Nilles

[57] ABSTRACT

A valve for a water faucet or the like of the type which when actuated does not have a part that rises, and which valve includes a rotary sealing plate against which spring loaded seals cooperate to seal the valve when the plate is turned to the "off" position. The valve includes a cartridge which has a stem formed as one piece along with the rotary valve and which cartridge also has a two piece sleeve in which the stem rotates. The assembled sleeve is formed of an upper sleeve and a lower sleeve which are held in assembled relationship by means of a recess and projection connection, thereby the upper sleeve can be easily moved axially from the lower sleeve when the valve is to be disassembled. The valve stem can be snapped into assembled relationship with the lower sleeve to facilitate assembly of the cartridge. Stop means are provided between the upper sleeve and the handle knob to limit rotation of the knob and its associated valve stem.

4 Claims, 7 Drawing Figures

PATENTED JAN 29 1974 3,788,601
FIG. 1
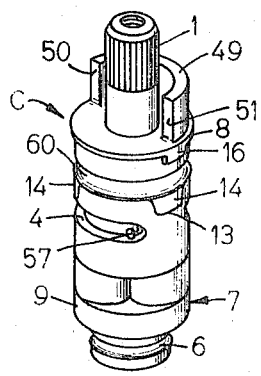
FIG. 4
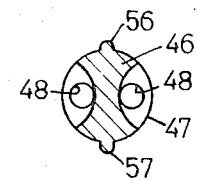
FIG. 6
FIG. 5
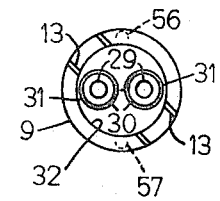
FIG. 2
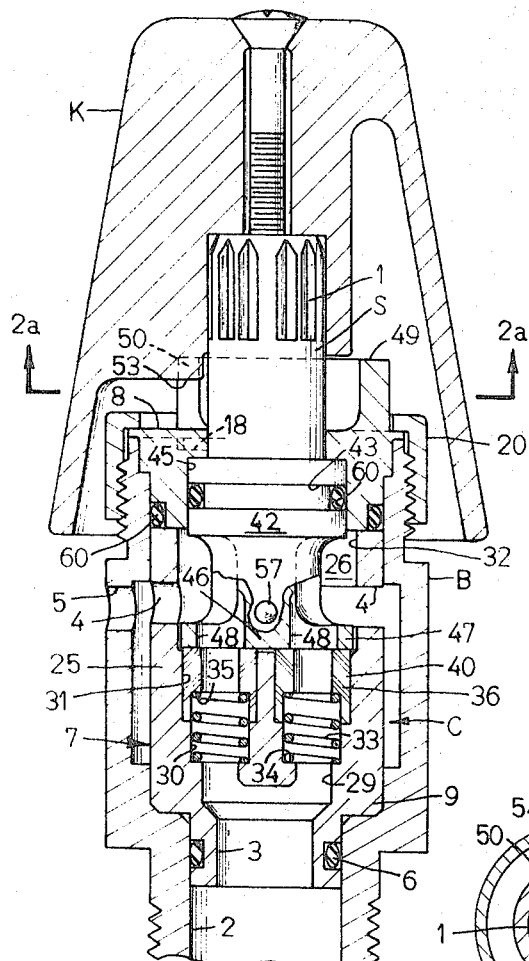
FIG. 2a
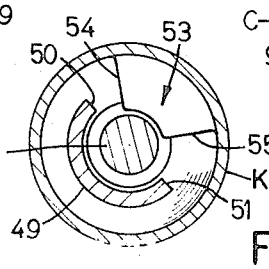
FIG. 3
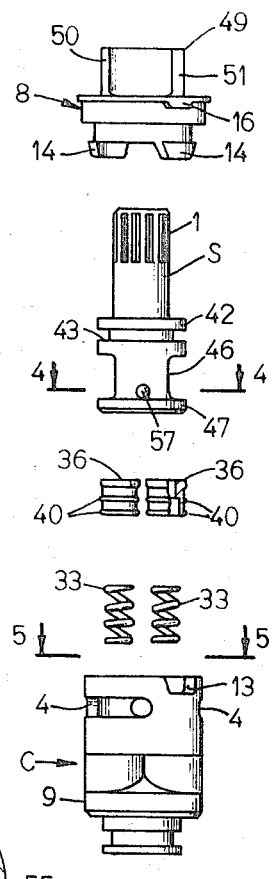

NON-RISE VALVE FOR FAUCETS OR THE LIKE

BACKGROUND OF THE INVENTION

The invention pertains to valves for water faucets or the like of the non-rise type and in which the valving is between stationary and rotary surfaces and spring loaded inlet seals bearing against the rotary member.

Devices of this general character have been proposed, but have heretofore been very complicated and contained numerous parts and were difficult and expensive to manufacture and also required considerable maintenance and repair.

A valve of the general type above referred to is shown in the U.S. Pat. No. 3,372,710, issued Mar. 12, 1968 to L. J. Miller and entitled "Single Handle Faucet Valve." Another example of the prior art is shown in the U.S. Pat. No. 3,645,493 of Feb. 29, 1972 entitled "Faucet Valve" and issued to Manoogian.

SUMMARY OF THE INVENTION

The present invention provides a non-rise valve cartridge having a stem rotatable in a two piece sleeve, which sleeve is held in assembled relationship by a recess and projection connection between the two sleeves, and which permits the upper sleeve to be simply shifted axially from the lower sleeve to disassemble the cartridge. The upper sleeve has diametrically opposed stop surfaces extending axially therefrom and which cooperate with complementary stop means carried by the handle knob. The stem of the cartridge can be snapped into assembled relationship with the lower sleeve to facilitate assembly of the remainder of the cartridge.

These and other objects and advantages of the present invention will appear hereinafter as this disclosure progresses, reference being had to the accompanying drawings.

BRIEF DESCRIPTION OF THE DRAWINGS

FIG. 1 is a perspective view of a valve assembly made in accordance with the present invention;

FIG. 2 is a longitudinal sectional view of the assembly shown in FIG. 1 together with the knob, but on an enlarged scale;

FIG. 2a is a view taken along line 2a—2a in FIG. 2, but on a reduced scale;

FIG. 3 is an elevational, exploded view of the assembly;

FIG. 4 is a sectional view taken along line 4—4 in FIG. 3;

FIG. 5 is a sectional view taken on line 5—5 of FIG. 3;

FIG. 6 is a perspective view of the stem and lower sleeve when being assembled, and with a portion of the sleeve being shown as broken away and in section;

DESCRIPTION OF THE PREFERRED EMBODIMENT

The non-rise cartridge C provided by the present invention is located within the valve body B and has a stem S oscillatably mounted within the assembled sleeve 7. A suitable knob K can be removably secured by a spline connection to the top end 1 of the stem in the known manner so as to be able to rotate the stem within the sleeve. Water pressure enters the valve body through the opening 2 and enters the opening 3 in the inlet end of the sleeve. The water, after passing through the cartridge, in a manner to be described, then flows out of the outlet openings 4 in the sleeve and through the discharge passage 5 of the body. O-ring 6 is provided on the end of sleeve 7.

The assembled sleeve 7 of the valve is comprised of an upper sleeve 8 and a lower sleeve 9 which are disengagably connected together as follows. The upper end of the lower sleeve has a pair of diametrically opposed recesses 13 opening axially upwardly therefrom, and the upper sleeve has a pair of complementary shaped and downwardly extending projections 14 which are adapted to slide into the recesses 13 of the lower sleeve. Thus the sleeve acts as a unit, and in order to disassemble the sleeve, it is only necessary to pull the upper sleeve axially from the lower sleeve.

It will be noted that the upper sleeve 8 has a pair of diametrically opposed lugs 16 which extend laterally from the upper end of the sleeve and are adapted to seat in a pair of complementary recesses 18 in the upper end of the valve body B. In this manner, the upper sleeve, as well as the lower sleeve are prevented from rotating in the valve body B. An internally threaded cap 20 threadably engages the periphery of the upper end of the body B and when tightened on the body acts to hold the assembled sleeve 7 captive in the body.

As previously mentioned, the lower sleeve 9 has a pair of diametrically opposed fluid passages in the form of slots 4 formed in its cylindrical wall 25, thereby placing the interior chamber 26 of the sleeve in communication with the outlet 5 in the valve body. The slots are arranged transversely in the sleeve.

A pair of inlet passages extend from the inlet 3 to the inner chamber 26 and these passages are comprised of bore 29, an intermediate counter bore 30, a larger bore 31, and upper bore 32. Mounted within the intermediate bore are springs 33 which bear against the shoulder 34 formed between bore 29 and counterbore 30 and which also bear against shoulder 35 of the cylindrical inlet seal 36. This inlet seal fits in the large bore 31 and is urged towards chamber 26 by springs 33. Annular ridges 40 around the seals 36 aid in sealing and act in effect as O-rings.

The stem S includes a cylindrical portion 42 adjacent the outwardly extending end portion 1, an annular groove 43 in which a sealing ring 44 is located for sealing engagement with the bore 45 of the upper sleeve. The stem also includes a central bridge portion 46 to the end of which is integrally formed the valve plate 47. Valve plate 47 has a pair of apertures 48 extending therethrough which are adapted to be in alignment, when the stem is turned to the valve open position, with the fluid inlet passages extending through the lower sleeve.

When the stem is turned to a closed position, the apertures 48 are unaligned with the inlet passages. The inlet seals 36 are urged by the springs 33 against the underside of valve plate 47 to thereby prevent the flow of fluid through the valve.

Referring again to the bridge 46 of the valve stem, it will be noted that when viewed in FIGS. 2 and 4, it has diametrically opposed recesses which permit the flow of water therearound.

Located on and formed integrally with the upper end of the upper sleeve 8, is an upwardly extending flange 49 which has diametrically oppositely disposed vertical shoulders 50 and 51. The flange 49 extends upwardly through the cap 20. The knob K, which has a spline connection with the upper splined end of the stem, has a stop member 53 (FIG. 2a) located inside which also defines shoulders 54 and 55 that are adapted to abut against, respectively, the stop shoulders 50 and 51 of the flange. In this manner, stop means are provided between the knob and the upper portion of the upper sleeve so as to define the rotational limits which the knob can be rotated when it is rotating the stem. This construction is simple and requires no extra parts, it only being necessary to form the stop members integrally with the knob and with the upper sleeve 8.

Means are also provided between the stem S and the lower sleeve 9 and which acts to hold them in assembled position preliminarily, prior to the final assembly of the rest of the cartridge. This means consists of a pair of diametrically opposed projections 56 and 57 located adjacent the lower end of the stem and integrally formed thereon. The projections together are of greater diametrical width than the central bore 32 of the sleeve 9. Thus, when it is desired to assemble the stem S in the sleeve 9 prior to the assembly of the other parts, as shown in FIG. 6, it is only necessary to push the stem S and particularly its projections 56 and 57 into the internal diameter of the lower sleeve 9, thus forcing the sleeve to momentarily expand to permit the projections 56 and 57 to pass through the sleeve to the slots 4 in the sleeve. Thus the stem and lower sleeve are held in loosely assembled relationship until the remaining parts of the cartridge, namely the upper sleeve 8 and seal ring 60, are assembled.

RESUME

The present invention also provides a simple and economical valve having relatively few parts and which is easy and economical to manufacture. The valve is also easy to assemble and disassemble, the two sleeves being held together by the recess and projection connection, and the entire sleeve in turn being held in the body and locked against rotation by the lug and recess projection between the upper sleeve and the valve body.

The stem and sleeve can be snapped and held together prior to assembling the other parts, thereby facilitating the entire assembly operation.

The stop means provided between the upper end of the sleeve and the handle knob eliminates parts found in the prior art and results in a simple, trouble-free, economically produced and easily assembled faucet.

I claim:

1. A valve cartridge comprising, a generally cylindrical lower sleeve having an internal fluid chamber, a pair of diametrically opposed and transversely arranged slots in said lower sleeve and communicating with said chamber, an upper sleeve disengagably connected with said lower sleeve, circumferentially spaced stop means extending axially outwardly from said upper sleeve, a recess and projection connection between said upper and lower sleeves whereby said sleeves act as a unit and are disengagable by axial relative movement therebetween, a stem rotatably mounted within said sleeves, and having a hand knob removably secured thereto for rotating the stem, said knob having stop means engagable with said stop means on said sleeve to thereby limit rotational movement of said knob and stem, said stem having radially extending projection means of a slightly greater lateral width than the internal diameter of the said fluid chamber of the lower sleeve to form a snap-fit therewith, a valve plate having aperture means therethrough and carried by the lower end of said stem, water inlet means in the lower end of said lower sleeve and alignable with said aperture means in said valve plate when said stem is turned to a valve open direction.

2. A valve cartridge as set forth in claim 1 in combination with a valve body having recess means in the upper end thereof, said upper sleeve having lugs extending therefrom and adapted to seat in said recesses to prevent turning of said sleeve within said body.

3. The combination as set forth in claim 2 including an end cap threadably engaged in the upper end of said body and having an inwardly turned flange for abuttment against said upper sleeve to hold the latter captive in said body, said stop means on said sleeve extending through said cap.

4. A fluid valve assembly comprising; a cartridge having a generally cylindrical lower sleeve having an internal fluid chamber, a pair of diametrically opposed and transversely arranged slots in said lower sleeve and communicating with said chamber, an upper sleeve disengagably connected with said lower sleeve, circumferentially spaced stop means extending axially outwardly from said upper sleeve, a recess and projection connection between said upper and lower sleeves whereby said sleeves act as a unit and are disengagable by axial relative movement therebetween, a stem rotatably mounted within said sleeves and having a hand knob removably secured thereto for rotating the stem, said knob having stop means engagable with said stop means on said sleeve to thereby limit rotational movement of said knob and stem, said stem having radially extending projection means of a slightly greater lateral width than the internal diameter of said fluid chamber of the lower sleeve to form a snap fit therewith, a valve plate having aperture means therethrough and carried by the lower end of said stem, water inlet means in the lower end of said lower sleeve and alignable with said aperture means in said valve plate when said stem is turned to a valve open direction; a valve body having recess means in the upper end thereof, said upper sleeve having lugs extending therefrom and adapted to seat in said recesses to prevent turning of said sleeve within said body, said upper sleeve also having a radially inwardly extending flange at the upper end thereof, said flange abutting against said stem to hold the latter captive in said upper sleeve, and an end cap threadably engaged on the upper end of said body and having an inwardly turned flange for abuttment against said upper sleeve to hold said cartridge captive in said body, said stop means on said sleeve extending through said cap.

* * * * *